Figure 1:
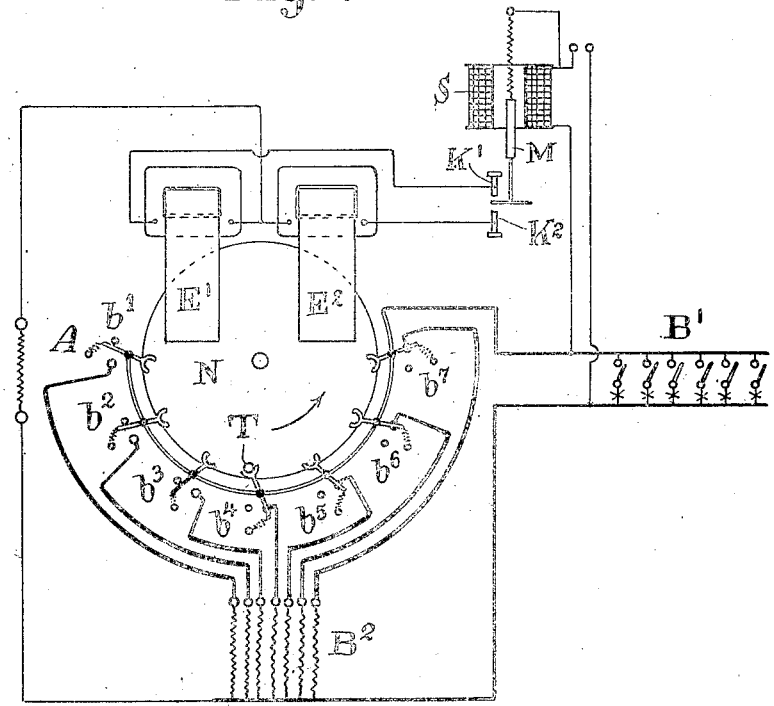

O. S. BRAGSTAD.
DEVICE FOR AUTOMATIC DISTRIBUTION OF A LIMITED ELECTRICAL EFFECT OR CURRENT INTENSITY BETWEEN LAMPS, &c.
APPLICATION FILED APR. 17, 1916.

1,263,369.    Patented Apr. 23, 1918.

Inventor
Ole Sivert Bragstad,
By [signature] Atty.

UNITED STATES PATENT OFFICE.

OLE SIVERT BRAGSTAD, OF TRONDHJEM, NORWAY.

DEVICE FOR AUTOMATIC DISTRIBUTION OF A LIMITED ELECTRICAL EFFECT OR CURRENT INTENSITY BETWEEN LAMPS, &c.

1,263,369.  Specification of Letters Patent.  Patented Apr. 23, 1918.

Application filed April 17, 1916. Serial No. 91,795.

*To all whom it may concern:*

Be it known that I, OLE SIVERT BRAGSTAD, a subject of the King of Norway, residing at Trondhjem, Norway, have invented certain new and useful improvements in devices for automatic distribution of a limited electrical effect or current intensity between lamps and similar devices liable to be cut in and out according to the momentary demand and devices capable of absorbing the spare effect or current available at any time, such as cooking and heating apparatus and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In purchasing electrical energy by maximum meter it is of essential importance to be able to utilize the energy throughout 24 consecutive hours and throughout the year. If the energy is used for lighting only, this is not possible as the demand for lighting is restricted to some shorter periods of the day or the year. A better utilization is obtained by using the electrical energy also for other purposes, for instance, cooking and heating, as these uses can partly take place at any hours of the day and consequently when there is no demand for lighting. Here the difficulty turns up however that it is necessary to cut in the electrical stoves, electrical hot water receptacles, etc., as the lamps are cut out.

The object of the present invention is to render these switchings automatic, so that such consumption apparatuses as are more or less independent of the time, for instance stoves, hot water receptacles or the like, are cut in automatically in proportion as other consumption devices which are dependent on the time for instance electrical lamps are cut out. When the latter consumption apparatus are cut in, the hot water receptacle, stoves or the like should in turn be automatically cut out so as to render the current consumption of the subscriber practically constant throughout the 24 consecutive hours and possibly equal to the amount of current which the subscriber is paying for.

Arrangements for similar purposes are previously known, which however do not work satisfactorily; among the same may be mentioned an arrangement comprising an interrupter mounted before the heating and cooking devices and acting at the same time as a current limiter so as to connect the consumption devices automatically by means of an electromagnet with the main circuit when the charge of the latter sinks below a predetermined amount and to once more automatically disconnect the same as soon as this amount is exceeded or attained.

This arrangement comprises only one automatic interrupter and does not consequently allow of establishing a constant charge on the plant nor of using the heating and cooking apparatus except when the lamps have been cut out in a number corresponding to the effect absorbed by the heating and cooking apparatus.

A better utilization of the available energy is obtained by another known arrangement according to which the heating and cooking devices are divided in a plurality of circuits capable of being separately cut in and out by means of relay interrupters so adjusted relatively to each other that by increasing charge in the lighting plant the relays will act to progressively cut out the various circuits from the heating devices. By decreasing charge in the lighting plant the relays will inversely act to successively cut in the various circuits into the heating devices.

This arrangement necessitates the use of as many relays as there are interrupters, and as the latter must act one by one, the relays must be adjusted for different currents.

In the present invention the heating and cooking devices are likewise divided in a plurality of circuits connected in parallel and which are automatically cut in or out as the other current consuming devices in the plant are cut out or in. The invention differs however from the latter known arrangement in that the cutting in and out always takes place by a constant charge of the plant as it is operated by one and the same current relay or contact ampere meter acting by means of an auxiliary current to actuate the interrupters contained in the various circuits.

Figure 2:
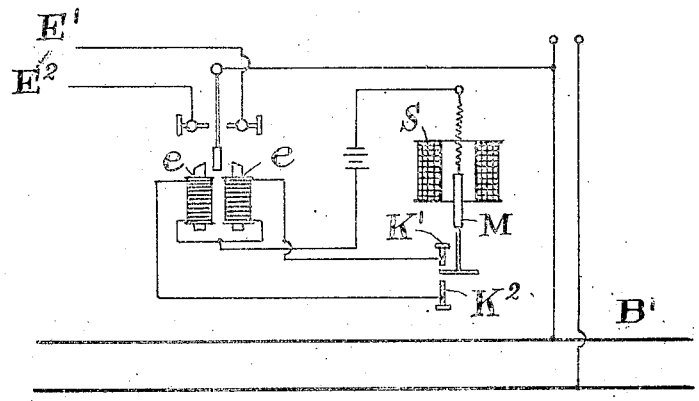

The invention is illustrated on the accompanying drawing in which Figure 1 is a diagram showing the principle of the invention and Fig. 2 a modified embodiment of same.

S is a current coil through which flows the total current consumed by the subscriber. $B^1$ are the current consuming devices which may be cut in or out by the subscriber according to the requirements, such as lamps. $B^2$ are the current consuming devices which are capable of absorbing the spare energy available at any time such as stoves or hot water receptacles. The latter apparatus are divided in a greater or less number of circuits connected in parallel and leading to an automatic switch A. The latter is operated by an auxiliary current which is cut in and out by the movements performed by the magnet M when actuated by the current coils S.

The above apparatus is designed for alternating current. When the current in the coil S attains its maximum amount the magnet N will be attracted and contact established at $K^1$ whereby the auxiliary current will flow through the coil around the electro-magnet $E^1$, the metal disk N will be put in rotation and the pin T carried by the same will be shifted in the direction of the arrow so as to open the interrupters $b^1$ $b^2$ whereby the current in the coil S will be reduced. When the current has diminished to such extent as to open the contact $K^1$ the movement of the disk will be stopped. If on the contrary the current in the coil S decreases to a certain extent below its maximum amount, contact will be made at $K^2$ and the auxiliary current will flow around the electromagnet $E^2$ whereby the metal disk N and the pin T will be turned in the opposite direction of the arrow and the interrupters $b^1$ $b^2$, etc., will be cut in until the current in the coil S becomes once more strong enough to open the contact at $K^2$.

In order to prevent the interrupters $b^1$ $b^2$, etc., from being left in an intermediate position and to be burnt by the arcs which would thereby arise, they may be executed as moment interrupters. According to Fig. 1 this is obtained by making the fork carried by the interrupters and engaging the pin T so wide as to provide for a sufficient play between the pin and the interrupter. The pin will thereby be shifted by the interrupter a certain distance only ahead and the remaining movement be provided for as indicated in Fig. 1, by a spiral spring connected with the interrupter.

Fig. 1 shows only a single disk N subjected to the action of the electromagnet $E^1$ and $E^2$ and carrying the pin T.

It is however also practicable to use two different disks connected with each other by means of a gearing a worm wheel and the like so as to obtain a greater amount of power on the pin T. If the apparatus is to be designed for continuous current, the pin T will have to be actuated by a continuous current motor adapted to be so reversed by means of a magnet actuated by the coil S as to move the pin in one or the other direction according to whether the current in the coil S is in excess or insufficient.

The current coil S with the movable magnet M and the two contacts $K^1$ $K^2$ may be denominated, in analogy with the term contact volt meter, a contact ampere meter. With alternating current the same may of course be connected with the main circuit by means of a current transformer and with continuous current by means of a shunt.

Instead of acting as shown in Fig. 1 to close the circuit for the electro-magnets $E^1$ $E^2$ which actuate the automatic interrupters, the contact-ampere meter may also act to close the circuit of a relay adapted in its turn to cut in the current for the electromagnets $E^1$ and $E^2$.

Such an arrangement is shown in the diagram of Fig. 2 in which $e$ is the electro-magnet of the relay and $K^1$ and $K^2$ are the contacts for the contact ampere meter.

Instead of using a contact ampere meter, as shown in Figs. 1 and 2 it is also practicable to use a contact watt meter. The latter may be executed either on the dynamometric principle or on the induction principle in analogy with the so called Ferraris watt meter.

For the contact ampere meter may accordingly be substituted any contact instrument for constant current (volt ampere) or constant effect.

According to Fig. 1 the automatic controller A is adapted to cut in and out directly the sources of consumption indicated with $B^2$, the working currents passing the switches of the automatic controller.

With larger amounts of energy such direct action is less practical it being preferred to provide an indirect cutting in and out of the current consuming devices $B^2$ by means of electrically operated switches in the several parts of the currents of said apparatus.

The auxiliary currents for said electrically operated switches are cut in and out by means of the controller A.

Claims:

1. An electrical system comprising a supply circuit having a variable lighting portion and a portion having a plurality of heating devices, an electromagnetically operated contact device having an actuating coil in series with said circuit, a reversely rotatable motor for successively increasing or decreasing the rate of energy supply to said heating portion in inverse proportion to the variation of load in the lighting portion controlled by auxiliary current through said contact device, and a plurality of switches controlling the heating devices, said switches arranged to be operated by the rotor of said motor.

2. An electrical system comprising a loaded circuit and an electromagnetically operated contact device having an actuating coil, in series with said circuit, said circuit having a variably loaded lighting portion and variably loaded heating portion containing a plurality of heating resistances, a snap switch for each heating resistance, a reversely rotatable induction motor supplied with current through said contact device and a pin on the armature of the motor, said switches being arranged in the path of said pin, whereby the switches will be opened and closed inversely as the load in the lighting portion.

In testimony that I claim the foregoing as my invention, I have signed my name in presence of two subscribing witnesses.

OLE SIVERT BRAGSTAD.

Witnesses:
HANS MÖLLER,
H. NUSTAD.